(12) United States Patent
Bokulic et al.

(10) Patent No.: US 7,139,567 B2
(45) Date of Patent: Nov. 21, 2006

(54) TONE BASED COMMAND SYSTEM FOR RECEPTION OF VERY WEAK SIGNALS

(75) Inventors: Robert Steven Bokulic, Columbia, MD (US); James Robert Jensen, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 422 days.

(21) Appl. No.: 10/847,942

(22) Filed: May 18, 2004

(65) Prior Publication Data

US 2005/0003791 A1    Jan. 6, 2005

Related U.S. Application Data

(60) Provisional application No. 60/479,277, filed on Jun. 18, 2003.

(51) Int. Cl.
H04B 7/185 (2006.01)
(52) U.S. Cl. ............... 455/427; 455/431; 455/267; 455/255; 340/870.8; 340/870.26; 244/158.1
(58) Field of Classification Search ............... 455/427, 455/431, 267, 263, 255, 12.1; 340/870.18, 340/870.19, 870.25, 870.26, 870.4; 244/158.1, 244/189; 375/136, 137
See application file for complete search history.

(56) References Cited

U.S. PATENT DOCUMENTS 5,392,450 A * 2/1995 Nossen ................ 455/12.1
5,442,696 A * 8/1995 Lindberg et al. ........... 379/386
5,828,335 A * 10/1998 Al-Dhahir et al. .......... 342/352
2003/0090413 A1* 5/2003 Syrjarinne et al. ..... 342/357.05

OTHER PUBLICATIONS

B. G. Boone, R. S. Bokulic, G. B. Andrews, R. L. McNutt, Jr., and N. Dagalakis, "Optical and Microwave Communications System Conceptual Design for a Realistic Interstellar Explorer," Proceedings of SPIE Conference on Free-Space Laser Communication and Laser Imaging II, Seattle, WA, Jul. 9-11, 2002.
M.K. Sue, T. Peng, and E.J. Wyatt, "A New Approach in Spacecraft Monitoring for Efficient Use of the Deep Space Network," Telecommunications and Data Acquisition (TDA) Progress Report 42-130, Aug. 15, 1997 (published by the Jet Propulsion Laboratory).
G. Lanyi and R. Kahn, "Tone Detection Via Incoherent Averaging of Fourier Transforms to Support the Automated Spacecraft-Monitoring Concept," Telecommunications and Data Acquisition (TDA) Progress Report 42-129, May 15, 1997 (published by the Jet Propulsion Laboratory).

* cited by examiner

Primary Examiner—Edward F. Urban
Assistant Examiner—Adeel Haroon
(74) Attorney, Agent, or Firm—Albert J. Fasulo, II (57) ABSTRACT

This disclosure presents a communication receiver system for spacecraft that includes an open loop receiver adapted to receive a communication signal. An ultrastable oscillator (USO) and a tone detector are connected to the open loop receiver. The open loop receiver translates the communication signal to an intermediate frequency signal using a highly stable reference frequency from the USO. The tone detector extracts commands from the communication signal by evaluating the difference between tones of the communication signal.

22 Claims, 4 Drawing Sheets

IF= Intermediate frequency
LO= Local oscillator
DDS= Direct digital synthesizer

Figure 7

TONE BASED COMMAND SYSTEM FOR RECEPTION OF VERY WEAK SIGNALS

CROSS-REFERENCE TO RELATED APPLICATIONS

This application claims priority to provisional application Ser. No. 60/479,277 filed Jun. 18, 2003, which is incorporated herein by reference.

STATEMENT OF GOVERNMENTAL INTEREST

This invention was made with government support under contract number NAS5-97271 awarded by NASA. The government has certain rights in this invention.

BACKGROUND OF THE INVENTION

1. Field of the Invention

The present invention generally relates to spacecraft radio frequency receivers and more particularly to an improved receiver that uses a tone based open loop receiver system and an ultrastable oscillator.

2. Description of the Related Art

Existing deep space receivers must phase-lock to the uplink signal and generate a data clock for command reception. These processes limit the sensitivity of present-day receivers to about −157 dBm for carrier lock and −145 dBm for reception of the minimum bit rate of 7.8125 bps. The phase-locking processes in the carrier and data tracking loops drive these threshold levels. The invention described below uses an open loop receiver that avoids the sensitivity loss associated with the use of phase lock loops (PLLs) or frequency lock loops (FLLs) and also avoids the lock threshold and acquisition delay to the system that a phase-lock or frequency-lock system would introduce.

Within this application several publications are referenced by arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art. For example, two of the papers referenced below [1, 2] describe tone-based systems that are used in ground-based systems to monitor spacecraft. However, these systems are different than the system presented below, which uses a tone-based system in conjunction with other elements, such as a USO, open loop receiver, etc., to receive weak uplink command signals at a spacecraft.

SUMMARY OF THE INVENTION

This disclosure presents a spacecraft-based communication receiver system that is positioned on the spacecraft and includes an open loop receiver adapted to receive a communication signal. With the invention an ultrastable oscillator (USO) outputs a first signal having a stable reference frequency. The USO maintains the accuracy of the stable reference frequency to a fractional frequency error of less than $10^{-12}$ over 60 seconds. An open loop receiver receives a communication signal and translates the communication signal to an intermediate frequency signal using the stable reference frequency of the first signal. This allows the open loop receiver to avoid the need to lock the phase or frequency of the communication signal. A tone detector measures the tone frequency of the intermediate frequency signal. Again, so as to avoid the need to lock the phase or frequency of the communication signal, the tone detector also operates according to the stable reference frequency of the first signal. The tone detector extracts commands from the intermediate frequency signal by evaluating the difference between tone frequencies of the intermediate frequency signal.

More specifically, the open loop receiver comprises a frequency downconverter, a bandpass filter connected to the frequency downconverter, an analog-to-digital converter connected to the bandpass filter, and a frequency synthesizer connected to the frequency downconverter and the analog-to-digital converter. The USO is connected to the frequency synthesizer. The tone detector comprises a tone detection algorithm unit and a command detector connected to the tone detection algorithm unit.

The tone frequencies can be either successive tone frequencies or simultaneous tone frequencies. Further, the tone detector can be adapted to begin tone frequency detection at a predetermined cyclical time to aid in synchronizing the tone detector with the communication signal.

The open loop receiver performs a linear conversion on the communication signal to reduce the communication signal frequency to a lower intermediate frequency and then the tone detector detects tone frequencies in the intermediate frequency signal indicative of tone frequencies in the communication signal. The tone detector performs a Fourier transform to detect the tone frequencies. The tone detector compensates for long-term frequency drift of the USO by measuring the frequency difference between tone frequencies instead of depending on the frequency measurement of a single tone frequency. Further, the tone detector uses tone periods having a length short enough so that performance is unaffected by long term frequency drift of the USO.

Thus, the invention processes the communication signal using the highly stable reference frequency from the USO, and then extracts commands from the communication signal by evaluating the frequency difference between tone frequencies of the communication signal. This includes reducing the frequency of the communication signal, to produce a downconverted signal, bandpass filtering the downconverted signal to produce a bandpass filtered signal, digitizing the filtered signal to produce a digitized signal, estimating the frequency of the communication signal using the bandpass filtered signal and a stable reference frequency from an ultrastable oscillator (USO), and extracting commands from the communication signal by evaluating the frequency difference between tone frequencies of the communication signal. These commands comprise ground-based instructions uplinked to a spacecraft.

The process of reducing the frequency of the communication signal comprises performing a linear conversion on the communication signal to reduce the communication signal to an intermediate frequency. While the process of detecting tones of the communication signal comprises sampling the intermediate frequency, and performing a Fourier transform.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The invention provides a technique that enables the reception of spacecraft commands at received signal powers as much as three orders of magnitude below those of current deep space systems. It reduces the cost of deep space operations by enabling the use of small aperture ground antennas to control spacecraft during the cruise phase. With the inventive system, referred to as tone-based commanding, control of spacecraft at interplanetary distances is possible using ground antennas of the 5 to 10-meter diameter class.

The inventive tone-based commanding involves the reception of commands that are sent in the form of precise frequency offsets using an open-loop receiver. Two key elements of this technique are an ultrastable oscillator and an open-loop receiver on-board the spacecraft.

Developing technologies (which may or may not be well-known) include a highly integrated transceiver or transponder system, ultrastable oscillator (USO), uplink radiometrics capability, and open-loop reception capability. The latter capability enables the inventive RF system to downconvert and record weak uplink signals on-board the spacecraft. The inventive transceiver or transponder system is implemented on the spacecraft using relatively low power, low mass plug-in cards or standalone boxes.

With the invention, the onboard USO provides the highly accurate frequency knowledge needed to improve the detection of very weak signals. The detection is accomplished by performing a linear downconversion of the received signal, and then determining its frequency through the use of an on-board signal processing algorithm. Using this open-loop technique, receiver command sensitivity on the order of $-175$ dBm (P/No$\approx-1.5$ dBHz) can be achieved. In this disclosure, "open-loop" refers to the fact that the spacecraft receiver is not phaselocked to the uplink signal. That is, the spacecraft receiver operates without phase or frequency locking, directly or indirectly, to the communication signal. This sensitivity enables the commanding of interplanetary probes using a relatively small dish antenna on the ground and a lowgain antenna on the spacecraft. The technique complements existing methods for weak signal, downlink beacon tone reception [1, 2].

Figure 1:
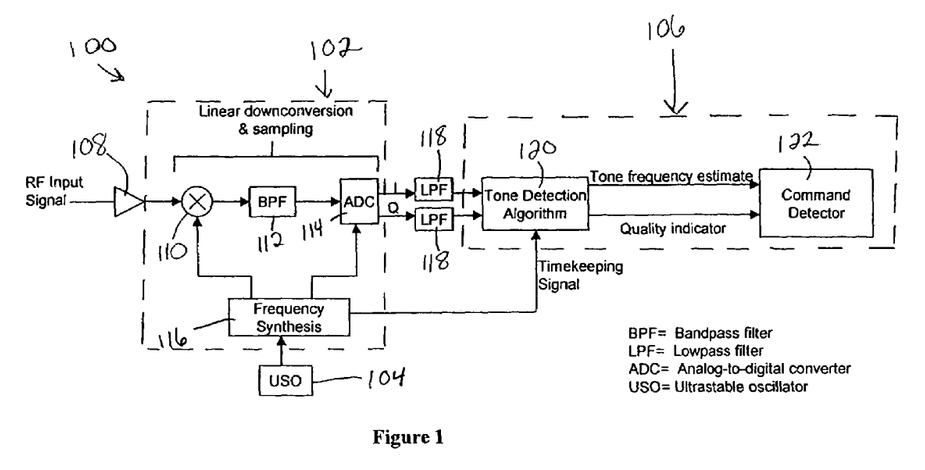
FIG. 1 shows a conceptual block diagram of the spacecraft portion of the tone-based commanding system.

FIG. 1 shows a block diagram of the spacecraft portion of the tone-based commanding system. More specifically, FIG. 1 illustrates an open-loop communication receiver system 100 for spacecraft that includes an open loop receiver 102 adapted to receive a communication signal. In an embodiment, the communication signal includes spacecraft commands encoded as differences between tone frequencies, i.e., as differential tone frequencies. An ultrastable oscillator (USO) 104 and a tone detector 106 are connected to the open loop receiver 102. The open loop receiver 102 translates the communication signal to an intermediate frequency signal using a highly stable reference frequency from the USO 104. Tone detector 106 extracts tone frequencies from the intermediate frequency signal, and then evaluates differences between the tone frequencies to extract or decode the spacecraft commands.

More specifically, the open loop receiver 102 comprises a frequency downconverter 110, a bandpass filter 112 connected to the frequency downconverter 110, an analog-to-digital converter 114 connected to the bandpass filter 112, and a frequency synthesizer 116 connected to the frequency downconverter 110 and the analog-to-digital converter 114. The USO 104 is connected to the frequency synthesizer 116. The tone detector 106 comprises a tone detection algorithm unit 120 and a command detector 122 connected to the tone detection algorithm unit. Item 108 represents an amplifier that amplifies the received RF signal, and items 118 represent low pass filters that filter out excess noise that are output to the tone detector 106.

The tone frequencies can be either successive tone frequencies or simultaneous tone frequencies. Further, the tone detector 106 can be adapted to begin tone frequency detection at a predetermined cyclical time to aid in synchronizing the tone detector 106 with the communication signal.

The open loop receiver 102 lowers the frequency of the communication signal by performing a linear conversion on the communication signal (via, for example, mixer 110) to reduce the communication signal frequency to an intermediate frequency (IF) signal. ADC 114 digitizes or samples the IF signal to produce a sampled IF signal. Tone detection algorithm 120 detects tone frequencies in the sampled IF signal representative of the tone frequencies in the communication signal. In an embodiment, tone detection algorithm 120 performs a Fourier transform to perform tone detection. Command detector 122 detects differences between the detected tone frequencies to recover the spacecraft commands. In this manner, the tone detector 106 compensates for long-term frequency drift of the USO 104 by measuring the difference in frequency between tone frequencies instead of depending on the frequency measurement of a single tone frequency.

Thus, the received RF signal is downconverted or translated to an intermediate frequency and then sampled. These samples are processed to determine the different command tone frequencies. The accuracy of the frequency measured by the spacecraft receiver will depend on the stability of the ground and spacecraft oscillators, as well as the ability of the ground station to compensate for uplink Doppler shift. Over long periods of spacecraft hibernation, the frequency knowledge will degrade as the oscillators drift and the orbit determination model ages. Therefore, the inventive tone detection system 100 operates differentially, with the frequency difference between successive tone frequencies carrying the command information. Alternatively, two tone frequencies could be transmitted simultaneously, with the command information carried as the frequency difference between the two tone frequencies. Each tone is actually an unmodulated uplink carrier signal with its frequency precisely controlled.

With respect to frequency stability considerations, the inventive system 100 can be considered to be a frequency-shift keyed modulation scheme. The number of different commands that can be sent will depend on the receiver detection channel bandwidth and the frequency stability of the system 100. Shown below are some example parameters of one implementation of the system design. The ground station oscillator is assumed to be an atomic frequency standard. System 100 parameters include the following:

| | |
|---|---|
| Uplink signal frequency: | 7.2 GHz |
| Command tone duration: | 60 s |
| Detection channel bandwidth: | 1500 Hz |
| (two-sided bandwidth after sampling) | |
| Ground station frequency stability: | $1 \times 10^{-12}$ |
| (over 60 seconds) | |
| Spacecraft USO frequency stability: | $1 \times 10^{-12}$ |
| (over 60 seconds) | |
| Spacecraft USO long-term drift: | $1 \times 10^{-11}$ |
| (over 24 hours) | |

The stability of the measured signal due to the combined ground station/spacecraft oscillators is $1.4 \times 10^{-12}$ (0.01 Hz@7.2 GHz) over the 60-second command tone duration. This is relatively small, so the stability of the signal measured by the spacecraft may depend more on the ability of the ground station to predict and remove geocentric and topocentric Doppler shift from the uplink signal. Because a differential system is used, the ability to hold the frequency that is observed at the spacecraft constant is the important issue, rather than the ability to achieve a specific frequency.

Figure 2:
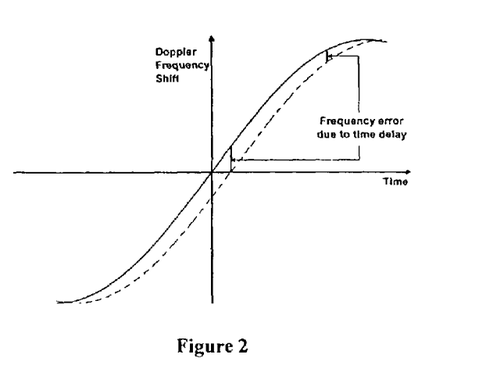
FIG. 2 illustrates a typical Doppler shift profile as a result of Earth rotation for a distant spacecraft.

As a simple illustration of the error that might occur due to compensation for Doppler shift, we can consider a distant spacecraft in the equatorial plane of the Earth and a ground station on the equator. FIG. 2 illustrates the Doppler shift profile that would result from such a geometry over the course of a ground station pass. The origin corresponds to the spacecraft at zenith and the ends of the abscissa correspond to the spacecraft at the horizon. The time-delayed curve shown on the figure represents what might occur due to an error in the spacecraft orbital position. A position error at zenith results in a large but relatively constant Doppler frequency error at the spacecraft. A position error at the horizon results in a smaller but more time-varying Doppler frequency error at the spacecraft. Preliminary calculations indicate that a spacecraft position error of 10,000 km at a distance of 6 astronomical units (AU) would result in a maximum Doppler frequency error of 0.12 Hz at zenith and a maximum variation in Doppler frequency error of 0.0005 Hz over 60 seconds at the horizon. Therefore, spacecraft position errors at this level do not represent a problem for signal stability over 60-second intervals.

Table 1 below shows the number of possible signal frequencies and associated command bit rates as a function of signal stability. These numbers are idealistic; in practice the number of commands will less than the number of possible signal frequencies due to practical considerations. The conclusion arrived at by these first-cut calculations, however, is that a useful system (~0.2 bps) can be achieved with only modest frequency stability requirements.

TABLE 1

Example Tone Command System Parameters

| Parameter | Frequency stability over 60 seconds | | |
|---|---|---|---|
| | 0.0167 Hz | 0.1 Hz | 1 Hz |
| Detection channel bandwidth (Hz) | 1500 | 1500 | 1500 |
| Tone duration (s) | 60 | 60 | 60 |
| Maximum number (N) of command frequencies | 90,000 | 15,000 | 1500 |
| Maximum number (n) of command bits ($2^n \leq N$) | 16 | 13 | 10 |
| Bit rate (bps) (=n/60) | 0.27 | 0.22 | 0.17 |
| Duration of discrete Fourier transform (s) | 60 | 10 | 1 |
| Number of transforms that are noncoherently summed | 1 | 6 | 60 |

With respect to fundamental limitations due to noise, the presence of thermal noise in the system will affect the achievable bit rate. In this section, we take a look at the theoretical bit rate that might be achieved with a low signal level system. A well-know fundamental limit in communication theory is expressed by the Shannon-Hartley theorem. According to this theorem, the channel capacity is expressed as:

$$C = B \log_2\{1 + P/(N_0 B)\} \text{ bps}$$

where B is the channel bandwidth in Hz, P is the signal power in watts, and $N_0$ is the noise power spectral density in watts/Hz. The noise power spectral density can be expressed as $N_0 = kT_s$ where k is Boltzmann's constant ($1.38 \times 10^{-23}$ J/K) and $T_s$ is the receiver system noise temperature in Kelvin.

We assume the received signal power to be −175 dBm, or about 20 dB below the lock threshold of current deep space receivers. We also assume a typical X-band receiver system noise temperature of 324 K. For a channel bandwidth of 1500 Hz, the theoretical channel capacity is $C \approx 1$ bps. This calculation provides a reality check that reliable operation at a bit rate on the order of 0.2 bps might be achieved in practice.

With respect to time synchronization, in a conventional digital communications receiver, the clock of the received data stream must be recovered to enable synchronous detection of the data. This synchronization typically requires the use of a phaselock loop. However, the use of a phaselock loop introduces a lock threshold and an acquisition delay to the system.

With long tone durations (say 60 seconds), the time synchronization aspect of the inventive open-loop technique is relatively straightforward. For example, the on-board time knowledge of a USO-based spacecraft is typically accurate to within one second of Earth time over hibernation periods up to one year (this aspect of spacecraft design is usually carefully managed by the mission). The reception of command tones can be pre-arranged by the tone detector 120 to start only at the top of any given hour. The spacecraft processor "looks" for a command tone starting at the top of the hour and, if it detects one, looks for another every tone period after that. To account for small timing errors, some extra time (say one second) can be added to the beginning and end of each tone transmission with only a small penalty to the uplink bit rate.

With respect to link analysis examples, to further assess the usefulness of a tone commanding system, we have analyzed two different mission scenarios: (1) a spacecraft operating at Jupiter distance (6 AU) using a 10-meter diameter ground antenna, and (2) a spacecraft operating at an interstellar distance of 1000 AU using a Deep Space Network (DSN) 70-meter diameter ground antenna [3]. These examples serve to establish the received signal levels that might be expected in an actual mission. Table 2 below shows the link analysis results for the two scenarios.

of a received signal frequency will result in two command errors, as is understood by those ordinarily skilled in the art.

The length of the discrete Fourier transform is bounded by the signal stability. In the limit of a very stable USO on the spacecraft and very good compensation of the uplink Doppler shift by the ground, the entire command tone interval of 60 seconds can be processed in a single transform. This approach assumes that the signal remains within one frequency bin width of 0.0167 Hz during the 60-second tone period. As the signal stability becomes worse, the length of the discrete Fourier transform must be shortened to produce wider frequency bins. For example, if the received signal was stable to within 0.1 Hz over 60 seconds, then six discrete Fourier transforms would be performed, each based on ten seconds of data.

To enable preliminary calculations of the noise performance of the tone-based command system, we have considered the three stability cases shown in Table 1. In all three cases, the complete data record is 60 seconds long and the

TABLE 2

Link Analysis Examples

| Parameter | Jupiter Link | Interstellar Probe Link |
|---|---|---|
| Ground station antenna size | 10-m diameter | 70-m diameter |
| Ground station transmit power | 1.0 kW | 18.4 kW (as per DSN handbook 810-5) |
| Ground station antenna gain | 54.5 dBic (overall efficiency = 50%) | 72.7 dBic (as per DSN handbook 810-5) |
| Ground antenna pointing loss | 0.5 dB | 0.15 dB |
| Path loss at 7.2 GHz | 288.65 dB (distance = 6 AU) | 333.09 dB (distance = 1000 AU) |
| Atmospheric loss | 0.2 dB | 0.2 dB |
| Polarization mismatch loss | 0.2 dB | 0.2 dB |
| Spacecraft antenna gain | +7 dBic (low gain antenna) | +15 dBic (medium gain antenna) |
| Spacecraft passive loss (between antenna and receiver input) | 2 dB | 2 dB |
| Spacecraft total received power (at receiver input) | −170.1 dBm | −175.3 dBm |
| Spacecraft receiver system noise temperature (at receiver input) | 324 K (includes 75 K antenna noise temperature, 2 dB passive loss, and 2 dB receiver noise figure) | 230 K (includes 75 K antenna noise temperature, 2 dB passive loss, and 1 dB receiver noise figure) |
| Received $P/N_o$ | +3.5 dBHz | −0.3 dBHz |

Figure 3:
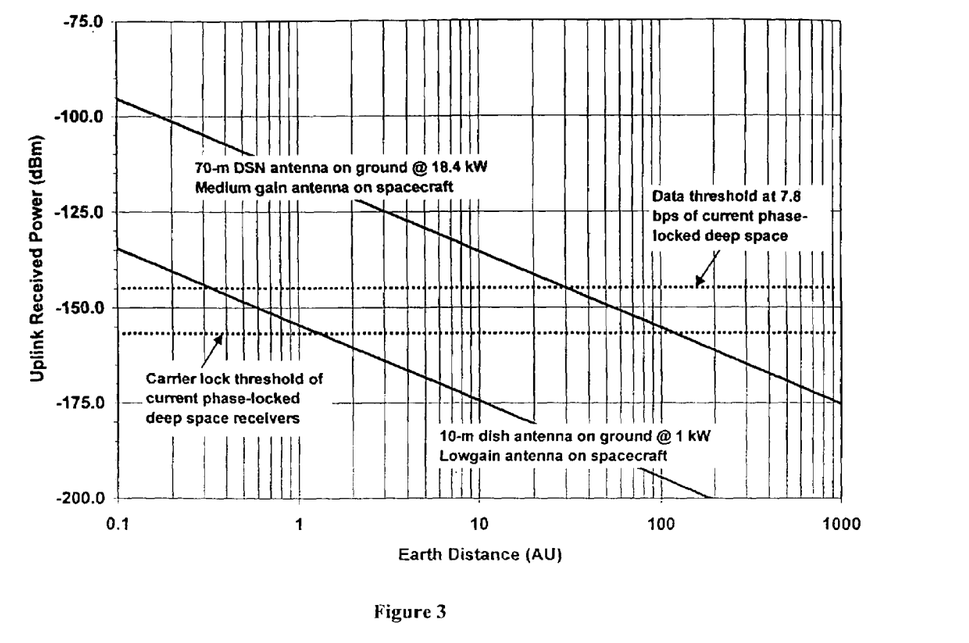
FIG. 3 shows the variation in received signal power as a function of distance for two scenarios.

In the Jupiter mission scenario, the spacecraft is assumed to be in hibernation attitude with a low gain antenna oriented toward the Earth. The ground station transmitter power is 1 kW. The analysis indicates a received signal power of −170 dBm. In the interstellar mission scenario, the spacecraft is assumed to be in hibernation attitude with a medium gain antenna oriented toward the Earth. The ground station transmitter power is 18.4 kW. The analysis indicates a received signal power of −175 dBm. FIG. 3 shows the variation in received signal power as a function of distance for the two scenarios. Thus, FIG. 3 illustrates the uplink analysis results for the two different mission scenarios.

With respect to performance in the presence of noise, reliable performance can be achieved with relatively low signal levels. Detection of the command tone is based on an examination of the power in each frequency bin following a discrete Fourier transform of the downconverted signal. When the highest power level in any frequency bin within the 1500 Hz detection channel bandwidth exceeds a specified threshold, the frequency corresponding to that maximum value is determined to be that of the command tone. The actual command information is determined by the change in frequency between two successive tones. Because the system is differential, an error made in the determination effective sample rate is twice the lowpass filter (LPF) cutoff frequency, or 1500 Hz. The two-sided bandwidth of the detection channel is 2×750=1500 Hz. The only difference between the three cases is the stability of the sampled signal, which bounds the maximum length of the discrete Fourier transform and determines the number of transforms that must be noncoherently summed.

We apply the Neyman-Pearson criterion to this problem by maximizing the probability of correct tone detection for a given false alarm probability. If we set the false alarm probability to $10^{-8}$ for each 60-second interval, then false alarms will occur at a rate of once every 190 years. This probability is spread across all of the frequency bins, so the probability of a false alarm at any particular frequency is very much smaller than $10^{-8}$. We define a false alarm to occur when no signal is transmitted and the noise results in the power in any one frequency bin crossing a detection threshold. The detection threshold itself would be based on the observed noise level to assure a constant false alarm rate that is independent of changes in the system noise temperature.

Figure 4:
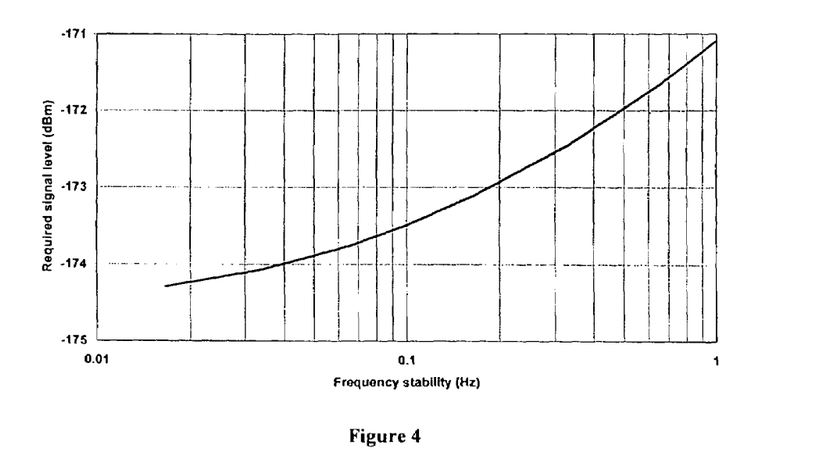
FIG. 4 illustrates the receiver signal power needed to achieve a 99% probability of correct detection with a false alarm probability of $10^{-8}$ over 60-second intervals.

Also, for the sake of illustration, we set the probability of detection to 99% and compute the signal power necessary to achieve this combination of false alarm and detection probabilities when the system noise temperature is 324 K. The result is shown in FIG. 4 as a function of the assumed frequency stability. More specifically, FIG. 4 illustrates the receiver signal power needed to achieve a 99% probability of correct detection with a false alarm probability of $10^{-8}$ over 60-second intervals. The two-sided detection channel bandwidth is 1500 Hz. The system noise temperature is 324 K. We see that achieving this level of performance with a signal power approaching −175 dBm will require excellent signal stability (<0.01 Hz over 60 s). Relaxing the stability to 1 Hz over 60 s increases the required signal power to about −171 dBm.

Figure 5:
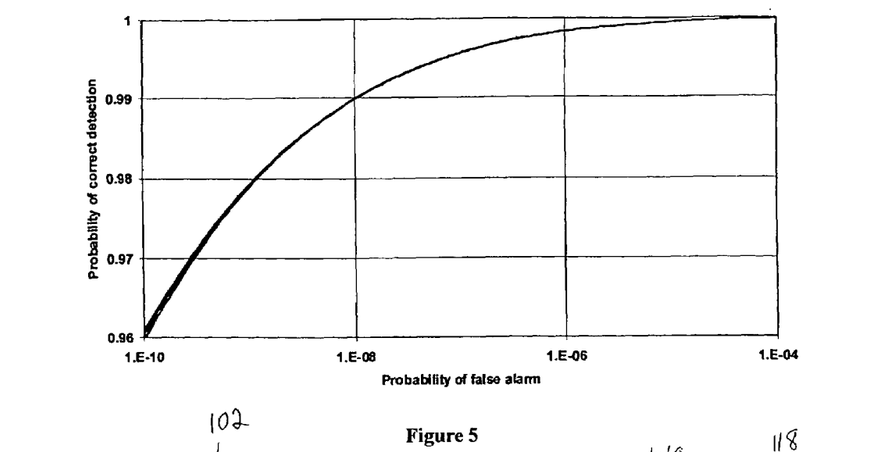
FIG. 5 illustrates the sensitivity of the probability of detection to changes in the assumed false alarm probability.

The sensitivity of the probability of detection to changes in the assumed false alarm probability is shown in FIG. 5. More specifically, FIG. 5 shows receiver operating curves. The different plots correspond to signal stabilities of 0.0167 Hz, 0.1 Hz, and 1 Hz. The probability of detection in all cases is set equal to 0.99 for a probability of false alarm of $10^{-8}$. Increasing the acceptable probability of false alarm by an order of magnitude, for example, would raise the probability of detection to 99.5% for all of the signal power levels shown in FIG. 4. The interdependence of the detection and false alarm probabilities is seen to be largely independent of the assumed frequency stability once the signal levels are chosen to meet the 99% detection and $10^{-8}$ false alarm probabilities.

Figure 6:
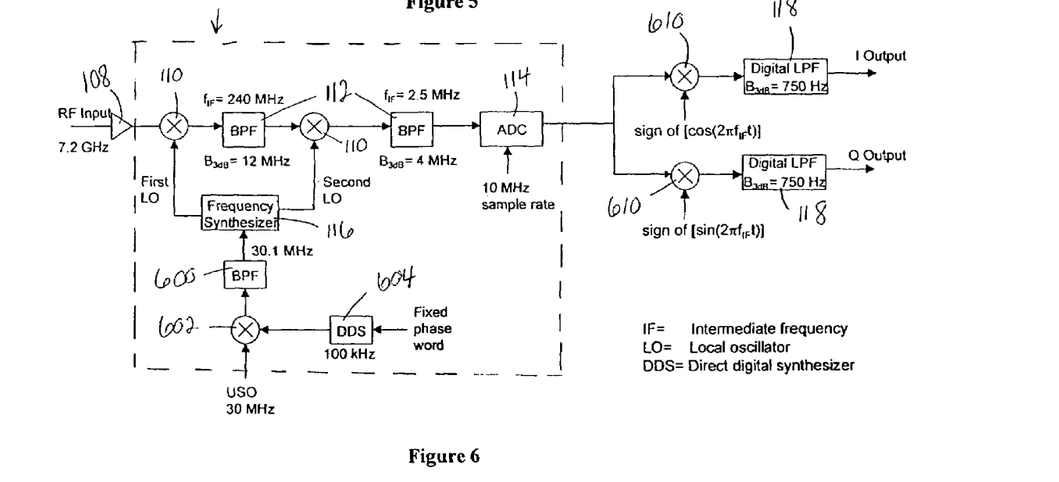
FIG. 6 shows one non-limiting example of how the invention could be implemented.

FIG. 6 shows an exemplary command receiver that could be implemented in, for example, a NASA flight experiment. The NASA New Horizons mission is planned for launch in January 2006 and will fly by Pluto and Charon as early as 2015. This mission will incorporate an advanced RF communications architecture that includes plug-in X-band uplink and downlink cards, regenerative ranging capability, uplink radio science capability, and a USO. As shown in FIG. 6, this example command receiver includes a double-down converter that has two sets of downconverters (analog mixers) 110 and associated bandpass filters 112 that receive first and second oscillation outputs from the frequency synthesizer 116. In addition, the oscillation signal output by the USO 104 is mixed (by mixer 602) using output from a direct digital synthesizer (DDS) 604, which operates based on a predetermined fixed phase word (as opposed to a variable phase word that would be used in phase lock loop systems). Also, this example applies separate functions using digital mixers 610 to the output from the ADC 114 that is supplied to the low pass filters 118. The numerical values shown in FIG. 6 are only examples, and one ordinarily skilled in the art would understand that each implementation of the invention would have its own unique design characteristics.

The command receiver of FIG. 6 can be placed into an open-loop configuration for making uplink radio science measurements. In this configuration, the X-band signal is linearly downconverted, then sampled and lowpass filtered to produce complex (I and Q) baseband samples in an output LPF bandwidth of 750 Hz. Again, the bandwidth is determined by the requirements of the radio science measurement. These samples, 16 bits for I and 16 bits for Q, are output at a 3.3 kilosample/s rate and recorded on the spacecraft solid state recorder (SSR).

The architecture of the New Horizons RF communication system provides a good opportunity to experiment with tone-based commanding during flight. At a convenient time during the cruise phase of the mission, one of the receivers could be put into open-loop radio science mode for reception of simulated uplink commands. Shown below is a general flow for such an experiment:

One receiver is put into open-loop radio science mode. The spacecraft solid-state recorder (SSR) is configured to record the radio science output of this receiver for the duration of the experiment.

The NASA Deep Space Network (DSN) transmits an uplink signal that is precisely controlled to present a constant frequency at the spacecraft receiver within ±750 Hz of the receiver center frequency.

Dummy commands are uplinked in the form of a series of frequency offsets initiated at a prescribed point in time (say at the top of the hour).

At the end of the experimental period (presumably still within the ground station pass), the contents of the SSR are dumped to the ground.

The recorded data is analyzed on the ground to decode the commands as if they were actually decoded in flight.

The proposed experiment would need to be incorporated into the mission planning. It appears that it could be done within the bounds of the existing design of the spacecraft hardware and software.

Figure 7:
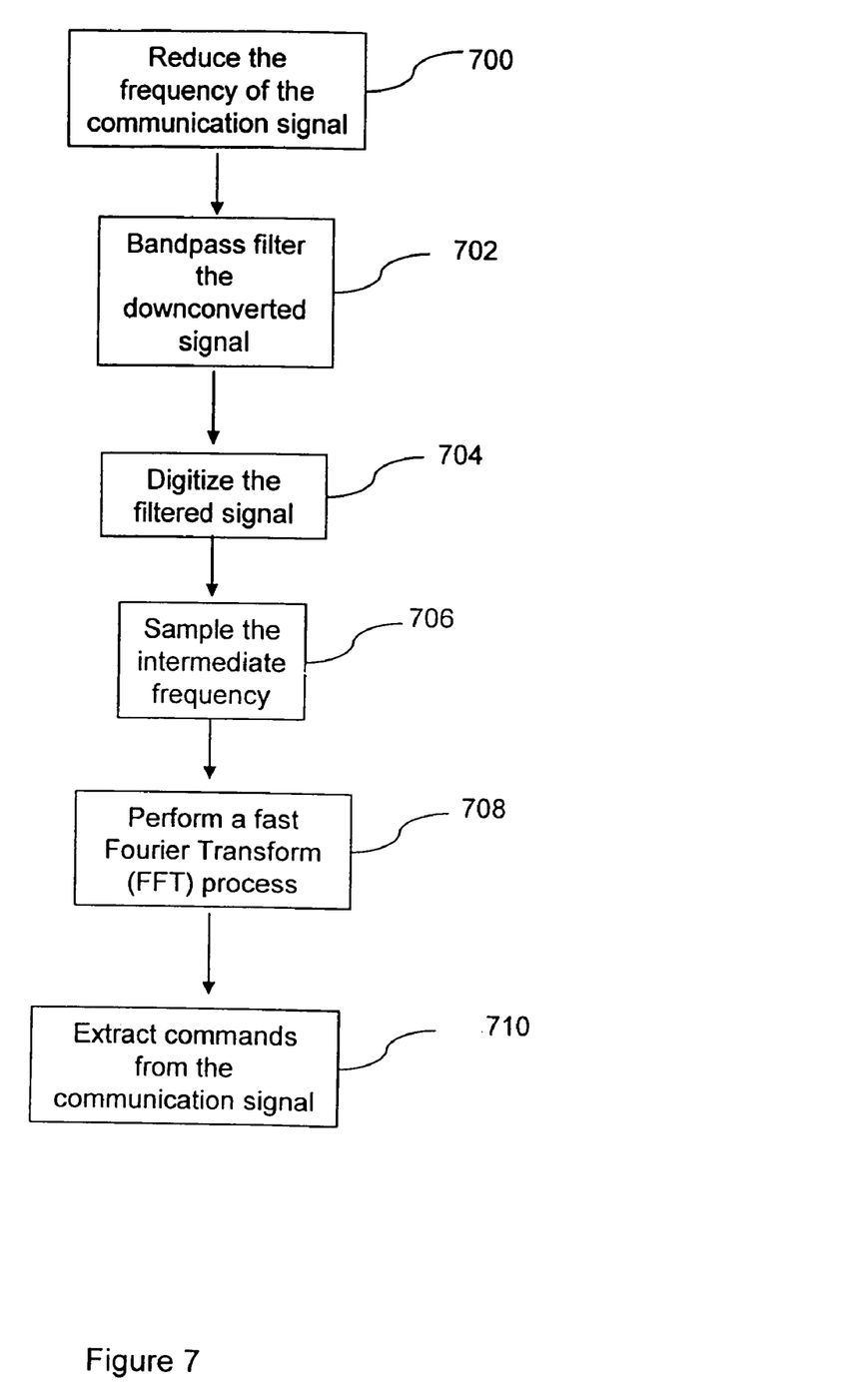
FIG. 7 shows the invention in flowchart format.

FIG. 7 is a flowchart of an example method of processing a communication signal received at, and on board, a spacecraft. The steps of the method are performed on the spacecraft in an open-loop manner. In step 700, the invention performs a linear down-conversion on the communication signal to reduce the communication signal to an intermediate frequency. Next, the invention bandpass filters the down-converted signal 702 to produce a bandpass filtered signal, and digitizes the filtered signal 704 to produce a digitized signal. The invention then estimates the tone frequency of the communication signal (706, 708) using the bandpass filtered signal and a stable reference frequency from an ultrastable oscillator (USO). More specifically, the invention samples the intermediate frequency 706 and performs a Fourier transform process 708 in order to estimate the tone frequency of the incoming communication signal. Next, in item 710, the invention extracts commands from the communication signal by evaluating the difference between tone frequencies of the communication signal. More specifically, the extraction process 710 evaluates the differences between the tone frequencies and thereby compensates for any long-term frequency drift of the USO.

In conclusion, this disclosure has presented the design of an uplink communication system capable of enabling a ground station with a relatively small antenna (5 to 10-meter diameter) to command a deep space probe. The system takes advantage of highly stable oscillators on both the ground and spacecraft ends of the link to enable operation at very low signal levels. The uplink command capability it provides complements existing techniques for downlink beacon tone reception. The design of the tone-based command system places realistic requirements on frequency stability and timing. A preliminary noise analysis indicates that reliable operation can be achieved with signal levels as low as −170 to −175 dBm at the spacecraft receiver. Opportunities exist to experiment with this technique on the ground and in flight using the advanced RF communications architecture on the New Horizons spacecraft.

A benefit of the invention is that it enables commanding of interplanetary deep space probes using commercially-owned small aperture ground stations (5 to 10 meter diameter). The invention also enables commanding of interstellar deep space probes using NASA's Deep Space Network.

While the invention has been described in terms of preferred embodiments, those skilled in the art will recognize that the invention can be practiced with modification within the spirit and scope of the appended claims.

REFERENCES

[1] M. K. Sue, T. Peng, and E. J. Wyatt, "A New Approach in Spacecraft Monitoring for Efficient Use of the Deep Space Network," Telecommunications and Data Acquisition (TDA) Progress Report 42–130, Aug. 15, 1997 (published by the Jet Propulsion Laboratory).

[2] G. Lanyi and R. Kahn, "Tone Detection Via Incoherent Averaging of Fourier Transforms to Support the Automated Spacecraft-Monitoring Concept," Telecommunications and Data Acquisition (TDA) Progress Report 42–129, May 15, 1997 (published by the Jet Propulsion Laboratory).

[3] B. G. Boone, R. S. Bokulic, G. B. Andrews, R. L. McNutt Jr., and N. Dagalakis, "Optical and Microwave Communications System Conceptual Design for a Realistic Interstellar Explorer," Proceedings of SPIE Conference 4821 on Free-Space Laser Communication and Laser Imaging II, Seattle, Wash., Jul. 9–11, 2002.

What is claimed is:

1. A communication receiver system on a spacecraft, the communication receiver configured to receive a communication signal including spacecraft commands encoded as differences between tone frequencies, comprising:
   an ultrastable oscillator (USO) on the spacecraft adapted to output a first signal having a stable reference frequency without phase or frequency locking to said communication signal;
   an open loop receiver on the spacecraft configured to translate said communication signal to an intermediate frequency (IF) signal using said stable reference frequency without phase or frequency locking to said communication signal; and
   a tone detector on the spacecraft configured to
      detect, using said stable reference frequency, tone frequencies in said IF signal indicative of said tone frequencies in said communication signal, and
      evaluate differences between said detected tone frequencies so as to extract said spacecraft commands, wherein said detector is configured to detect and evaluate without phase or frequency locking to said communication signal.

2. The system in claim 1, wherein said USO maintains the accuracy of said stable reference frequency to a fractional frequency error of approximately less than $10^{-12}$ over 60 seconds.

3. The system in claim 2, wherein each of said frequency tones in said communication signal has a duration of approximately 60 seconds.

4. The system in claim 1, wherein said tone frequencies comprise one of successive tone frequencies and simultaneous tone frequencies.

5. The system in claim 1, wherein said tone detector is adapted to begin tone frequency detection at a predetermined cyclical time to aid in synchronizing said tone detector with said intermediate frequency signal.

6. The system in claim 1, wherein said open loop receiver includes a digitizer to produce the intermediate frequency signal as a sampled intermediate frequency signal, and wherein said tone detector detects said tone frequencies in said sampled intermediate frequency signal.

7. The system in claim 1, wherein said spacecraft command comprises ground-based instructions uplinked from said ground station to said spacecraft.

8. A spacecraft-based communication receiver system comprising:
   an ultrastable oscillator (USO) adapted to output a first signal having a stable reference frequency;
   an open loop receiver adapted to receive a communication signal and translate said communication signal to an intermediate frequency signal using said stable reference frequency of said first signal, wherein said open loop receiver avoids the need to lock the phase or frequency of said communication signal, and wherein said open loop receiver comprises a frequency downconverter, a bandpass filter connected to said frequency downconverter, an analog-to-digital converter connected to said bandpass filter, and a frequency synthesizer connected to said frequency downconverter and said analog-to-digital converter; and
   a tone detector adapted to measure the tone frequency of said intermediate frequency signal, wherein said tone detector also operates according to said stable reference frequency of said first signal, and wherein said tone detector extracts commands from said intermediate frequency signal by evaluating the difference between tone frequencies of said intermediate frequency signal.

9. The system in claim 8, wherein said USO maintains the accuracy of said stable reference frequency to a fractional frequency error of less than $10^{-12}$ over 60 seconds.

10. The system in claim 8, wherein said tone frequencies comprise one of successive tone frequencies and simultaneous tone frequencies.

11. The system in claim 8, wherein said tone detector is adapted to begin tone frequency detection at a predetermined cyclical time to aid in synchronizing said tone detector with said intermediate frequency signal.

12. The system in claim 8, wherein said tone detector uses tone frequency periods having a length sufficient to compensate for long-term frequency drift of said USO.

13. The system in claim 8, wherein said tone detector uses tone periods having a length sufficient to compensate for long-term frequency drift of said USO.

14. The system in claim 8, wherein said commands comprise ground-based instructions uplinked to a spacecraft.

15. A method for receiving a communication signal on board a spacecraft, said method comprising:
   processing said communication signal through an open loop receiver using a first signal having a stable reference frequency from an ultrastable oscillator (USO) to produce an intermediate frequency signal, wherein said open loop receiver uses said stable reference frequency to avoid the need to lock phase or frequency of said communication signal,
   detecting tone frequencies of said intermediate frequency signal using said stable reference frequency of said first signal from said USO, and
   extracting commands from said intermediate frequency signal by evaluating the difference between tone frequencies of said intermediate frequency signal.

16. The method in claim 15, wherein said different tone frequencies comprise one of successive tone frequencies and simultaneous tone frequencies.

17. The method in claim 15, wherein said process of detecting said tone frequencies begins tone frequency detection at a predetermined cyclical time to aid in synchronizing with said intermediate frequency signal.

18. The method in claim 15, wherein said process of detecting tone frequencies of said intermediate frequency signal comprises sampling said intermediate frequency.

19. The method in claim 15, wherein said process of detecting tone frequencies of said intermediate frequency signal comprises performing a Fourier transform.

20. The method in claim 15, wherein said process of detecting said tone frequencies uses tone periods having a length sufficient to compensate for long-term frequency drift of said USO.

21. A method of processing a communication signal on a spacecraft, the communication signal including spacecraft commands encoded as differences between tone frequencies, comprising:
   (a) generating a first signal having an ultrastable reference frequency;
   (b) translating said communication signal to an intermediate frequency (IF) signal using said stable reference frequency;
   (c) detecting, using said stable reference frequency, tone frequencies in said IF signal indicative of said communication signal tone frequencies;
   (d) extracting commands from said IF signal by evaluating differences between said detected IF signal tone frequencies; and
   (e) performing steps (a) through (d) on said spacecraft without phase or frequency locking to said communication signal.

22. The method of claim 21, wherein step (b) includes:

band pass filtering the IF signal; and digitizing the band pass filtered IF signal, to produce a digitized IF signal, wherein step (c) includes detecting said tone frequencies in said digitized IF signal.

* * * * *